United States Patent [19]

Glynn

[11] Patent Number: 4,652,981
[45] Date of Patent: Mar. 24, 1987

[54] ILLUMINATABLE BELT

[76] Inventor: Kenneth P. Glynn, 118 Franklin Ct., Flemington, N.J. 08822

[21] Appl. No.: 759,489

[22] Filed: Sep. 19, 1985

[51] Int. Cl.$^4$ ............................................. F21L 15/08
[52] U.S. Cl. .................................. 362/103; 362/104; 362/108
[58] Field of Search ............... 362/103, 104, 105, 106, 362/108, 374, 806, 811, 32

[56] References Cited

U.S. PATENT DOCUMENTS

| | | | |
|---|---|---|---|
| 2,199,996 | 5/1940 | Hobson et al. | 362/103 |
| 2,304,367 | 12/1942 | Meyer et al. | 362/103 |
| 3,641,333 | 2/1972 | Gendron | 362/108 |
| 3,675,005 | 7/1972 | Curiel | 362/103 |
| 3,720,918 | 3/1973 | Perl | 362/103 |
| 3,836,759 | 9/1974 | Silverman | 362/103 |
| 4,164,008 | 8/1979 | Miller et al. | 362/103 |
| 4,173,201 | 11/1979 | Chao et al. | 362/103 |
| 4,186,425 | 1/1980 | Nadimi | 362/104 |
| 4,283,756 | 8/1981 | Beamon | 362/108 |
| 4,523,258 | 6/1985 | Morse et al. | 362/108 |

Primary Examiner—Raymond A. Nelli
Attorney, Agent, or Firm—Kenneth P. Glynn

[57] ABSTRACT

An illuminatable belt is described which includes a two piece buckle, a power pack and an elongated tube connected to one piece of the buckle at one end and to the second piece of the buckle at the opposite end. The power pack contains battery operated flashlight type circuitry with an on-off switch, and a bulb is connected to the circuit. A bundle of optical fibers extends from the bulb area into the hollow tube away from the bulb. When the power pack contains batteries and is turned on, light shines away from the power pack into the fiber bundle so as to illuminate the hollow tube, e.g., throughout the entire length of the belt.

14 Claims, 6 Drawing Figures

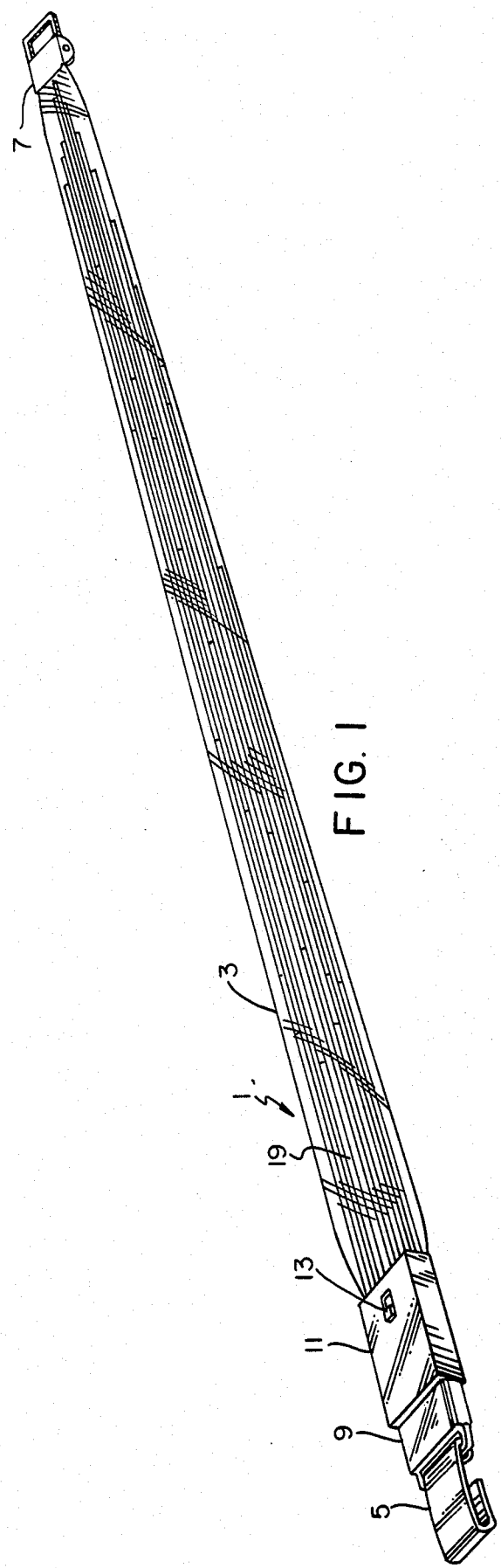
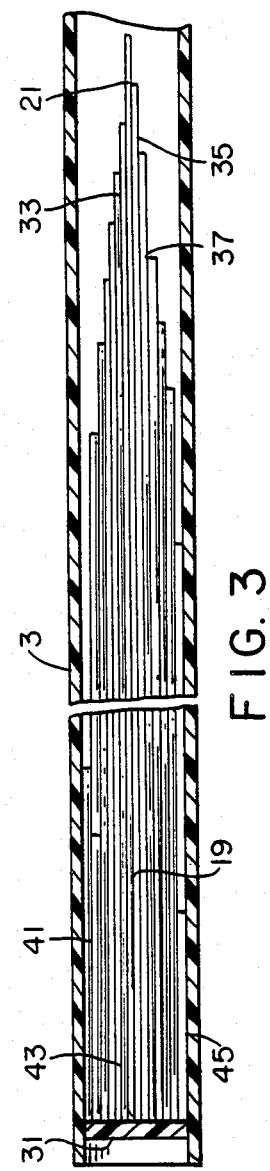

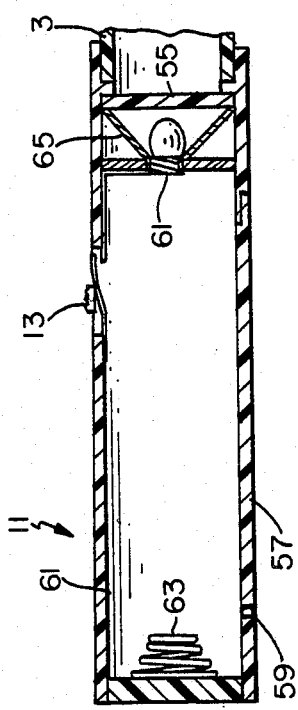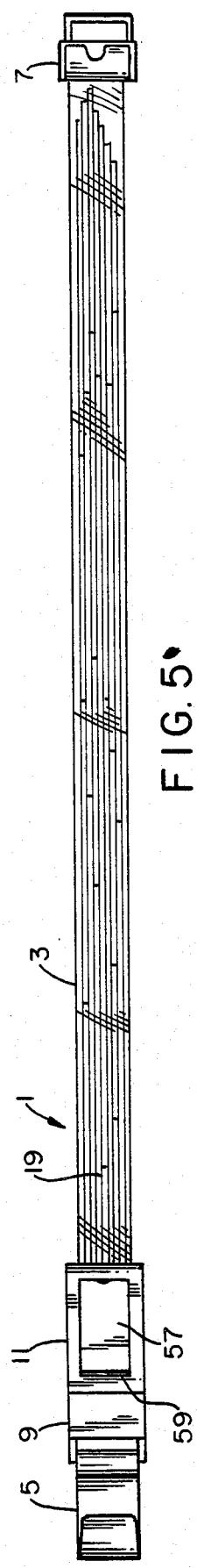

ILLUMINATABLE BELT

BACKGROUND OF THE INVENTION

1. Field of the Invention

The present invention is directed to a novel belt, and more particularly to an illuminatable belt. The present invention device is specifically a plastic type of belt which includes a power pack and bulb and utilizes fiber optics for transmitted illumination.

2. Prior Art Statement

The art is replete with novel belts and sashes of various configurations, such as those having decorations, reflectors and other features which enhance the entertainment value or the safety value for the wearer. Notwithstanding the formidable collection of general prior art relating to belts, no patent is known to the inventor herein which would be directed to the fiber optics illumination of belts.

U.S. Pat. No. 2,378,075 to Frecska describes a safety traffic signal belt using battery powered bulbs. However, this patent describes an invention having many exposed bulbs, which is impractical, operates differently from the present invention and achieves a totally distinct purpose. The present invention is directed to an amusement device, i.e., a belt to be worn with many tens or hundreds of small light points for show and for night dancing and the like. The present invention belt would generally not be used as a safety traffic signal belt because the diffused fiber optics illumination would not be bright enough. On the other hand, the Frecska prior art belt cannot be worn and sat against, e.g. in a wooden chair, without possibly popping a bulb. The bulbs in the Frecska invention are dangerous, are exposed and are plural. In the present invention, there need only be one, concealed bulb and the Frecska problems are thereby avoided.

French Patent No. 2,276,069 to Maurice Fradin teaches an illuminated jump rope which relies upon a plurality of strings of bulbs running through a tube, and relies upon complex mechanical and electrical arrangements. However, this French Patent describes a jump rope with handles which operate longitudinally at right angles to the length of the tube containing the strings of lights. This necessitates a "yoke" or "axle" arrangement for each handle whereby the yoke is connected to the tube and must rotate 360° around the handle for each jump. Further, French Pat. No. 2,276,069 also requires circuitry connected by sliding ring tracks which may eventually malfunction due to spring failure, mechanical wear or other failure. Additionally, this French Patent teaches the use of many light bulbs in strings, which, like the aforesaid Frecska invention bulbs, may blow out, short or wear out.

The present invention, however, relies upon fiber optics, has only one bulb, has no moving parts which rotate continuously, etc. Further, the present invention is directed to a fiber optics illuminatable belt and not a jump rope, the respective arts being non-analogous.

For the above reasons, it is urged that the present invention is neither taught nor rendered obvious by either the U.S. Patent to Frecska or by French Pat. No. 2,276,069.

SUMMARY OF THE INVENTION

A novel, illuminatable belt is described which includes a two piece buckle, a power pack and an elongated tube connected to one piece of the buckle at one end and to the second piece of the buckle at the opposite end. The power pack contains battery operated flashlight type circuitry with an on-off switch, and a bulb is connected to the circuit. A bundle of optical fibers extends from the bulb area into the hollow tube away from the bulb. When the power pack contains batteries and is turned on, light shines away from the power pack into the fiber bundle so as to illuminate the hollow tube, preferably throughout the entire length of the belt.

BRIEF DESCRIPTION OF THE DRAWINGS

Various other objects, features and attendant advantages of the present invention will be more fully appreciated as the same becomes better understood from the following detailed description in connection with the accompanying drawings, in which like reference characters designate like or corresponding parts through several views and wherein:

FIG. 1 is a perspective view of one preferred embodiment of the present invention device;

FIG. 2 shows a side view of the preferred embodiment of the present invention shown in FIG. 1;

FIG. 3 shows a cut view of a section of hollow tube used in an embodiment of the present invention;

FIG. 4 illustrates a side cut view of another embodiment of a power pack for a device of the present invention;

FIG. 5 shows a rear view of the present invention device shown in FIGS. 1 and 2; and, FIG. 6 shows an alternative embodiment of the present invention.

DETAILED DESCRIPTION OF THE PRESENT INVENTION

Referring now more particularly to the Figures, a present invention illuminatable belt is shown as 1 in FIG. 1. A hollow elongated tube 3 is shown which is non-opaque. Tube 3 may be either translucent or transparent but is preferably transparent and is of sufficient length, strength and flexibility so as to be used for a belt, e.g. for a child or for an adult. In this specific embodiment, tube 3 is made of clear Tygon tubing of about one-half to about three-quarters of an inch in diameter (Tygon tubing is a trade name product sold by Norton Specialty Plastics Division, Akron, Ohio). It may be made of other similar material and may have a circular cross-section, an oval cross-section or otherwise, as a matter of design.

Belt buckle pieces 5 and 7 are shown wherein each is connected to opposite ends of tube 3. Buckle piece 5 is indirectly connected to tube 3 via connecting piece 9 and power pack 11, as shown and buckle piece 7 is directly attached. They may be attached by any known means. The buckle pieces may be metal, plastic, woven or other material, as a matter of design. Power pack 11 contains battery operated illumination circuitry of the flashlight type which is shown in more detail and discussed in conjunction with FIG. 3 and FIG. 4 below. On-off switch 13 is shown on the side of power pack 11. On-off switch 13 is operatively connected to the mentioned circuitry contained within the power pack 11. Optical fiber bundle 19 is contained in tube 3 with the fibers being of varying lengths, as discussed below. Bundle 19 is directly connected to the power pack 11 at one end. A light bulb is likewise connected to the mentioned circuitry and is positioned so as to shine away from the handle and into optical fiber bundle 19 down hollow tube 3. FIG. 2 shows a side view of illuminatable belt 1 of FIG. 1. Like parts are identically numbered. As FIG. 2 illustrates, buckle piece 7 is a clamp on member and works like the old Army belt. While this represents only one of many embodiments, it is particularly convenient in that it enables shortening of the belt by cutting the plastic tube 3 and fibers, and merely reclamping buckle piece 7 so as to obtain the desired belt length.

FIG. 3 shows a cut view of a section of hollow tube 3 used in one embodiment of the present invention. As shown, hollow tube 3 contains fiber bundle 19 and optional color disc 31. Longest fiber 21 is shown to be approximately coaxial with the central axis of tube 3 and longer fibers 33, 35, 37 and the like are bundled contiguously to longest fiber 21, whereas shorter fibers 41, 43, 45 and the like are bundled around and outside of the longer fibers.

FIG. 4 shows a cut side view of a power pack 11 used in one preferred embodiment of the present invention. Power pack 11 is shown with a section of hollow tube 3 bonded thereto, e.g. heat sealed or glued. As shown, power pack 11 is rectangular, and it contains an optional bulb magnifying lens 55 at one end which allows light to enter fiber bundle 19 (not shown) in tube 3, and it contains a hinged battery access door 57 on its back, with hinges 59 (for simplicity, a snap is not shown and the door may be attached by any conventional method). Power pack 11 also contains on-off switch 13 and battery operated flashlight type circuitry 61. The circuitry includes coil spring terminal 63 and is connected to bulb holder 65. When a bulb is screwed into the socket 67 of holder 65 and batteries are inserted, the circuit is opened and closed for operation via switch 13.

FIG. 5 illustrates belt 1 again but showing the back and, in particular, door 57 and hinge 59.

FIG. 6 merely shows an alternative illuminatable belt 71. This belt 71 has clear tube 73 with fiber bundle 75 and power pack 77. The power pack 77 has switch 79 and light bulb 81. Belt 71 operates in a manner similar to belt 1 discussed above, but includes leather eyelet buckle piece 83, connecting piece 85 and conventional metal buckle 87.

In general, all parts except for the conductive circuitry and glass lens may be constructed of plastic, including the hollow tube. Further, while it is preferred to allow for battery replacement and even bulb replacement in actual design, one embodiment consists of permanently enclosing long life batteries and bulb.

Obviously, numerous modifications and variations of the present invention are possible in light of the above teachings. It is therefore to be understood that within the scope of the appended claims, the invention may be practiced otherwise than as specifically described herein.

What is claimed is:

1. An illuminatable belt device which comprises:
   (a) a two-piece belt buckle;
   (b) an elongated tube which is non-opaque and which has the length, strength and flexibility to be used as a belt, said tube being connected to one piece of said buckle at one end and to the second piece of said buckle at the opposite end;
   (c) a power pack which is connected to said tube;
   (d) a battery-operated power supply of the flashlight type, being located within said power pack;
   (e) an on-off switch on the outside of said power pack which is connected to said battery-operated power supply;
   (f) a light bulb, being connected to said battery-operated power supply and being connectively positioned with respect to said power pack and said tube so as to be capable of shining away from said power pack and into said tube; and,
   (g) at least one bundle of optical fibers contained within said tube, said bundle being positioned in the light path of said bulb so as to be capable of fiber optic transmittal illumination within said tube, said bundle being of varied lengths of optical fibers, the longest of which is approximately the tube length, the total number of optical fibers within said bundle being at least forty in number.

2. The device of claim 1 wherein said tube is transparent.

3. The device of claim 1 wherein said tube is translucent.

4. The device of claim 1 wherein at least one color filter is positioned between said bulb and a fiber bundle so as to be capable of colored light fiber optics illumination.

5. The device of claim 2 wherein at least one color filter is positioned between said bulb and a fiber bundle so as to be capable of colored light fiber optics illumination.

6. The device of claim 3 wherein at least one color filter is positioned between said bulb and a fiber bundle so as to be capable of colored light fiber optics illumination.

7. The device of claim 1 wherein said power pack includes a spring loaded pull-open section to facilitate insertion and removal of batteries.

8. The device of claim 2 wherein said power pack includes a spring loaded pull-open section to facilitate insertion and removal of batteries.

9. The device of claim 3 wherein said power pack includes a spring loaded pull-open section to facilitate insertion and removal of batteries.

10. The device of claim 4 wherein said power pack includes a spring loaded pull-open section to facilitate insertion and removal of batteries.

11. The device of claim 5 wherein said power pack includes a spring loaded pull-open section to facilitate insertion and removal of batteries.

12. The device of claim 6 wherein said power pack includes a spring loaded pull-open section to facilitate insertion and removal of batteries.

13. The device of claim 1 wherein said tube is hollow.

14. The device of claim 1 wherein said tube is extruded in place about said bundle of fibers.

* * * * *